(12) United States Patent
Gerace

(10) Patent No.: US 8,604,160 B2
(45) Date of Patent: *Dec. 10, 2013

(54) COMPOSITE ROOFING OVERLAY CONTAINING RECYCLED PAINT WASTE AND RECYCLED CRUSHED GLASS

(71) Applicant: Polymer Recycling, LLC, Powhatan, VA (US)

(72) Inventor: Michael Joseph Gerace, Powhatan, VA (US)

(73) Assignee: Polymer Recycling, LLC, Powhatan, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/716,689

(22) Filed: Dec. 17, 2012

(65) Prior Publication Data

US 2013/0097953 A1    Apr. 25, 2013

Related U.S. Application Data

(60) Continuation-in-part of application No. 13/221,988, filed on Aug. 31, 2011, now Pat. No. 8,334,361, which is a division of application No. 11/753,605, filed on May 25, 2007, now Pat. No. 8,029,868, application No. 13/716,689, filed on Dec. 17, 2012, which is a continuation-in-part of application No. 13/370,371, filed on Feb. 10, 2012, which is a continuation-in-part of application No. 13/221,988.

(60) Provisional application No. 60/808,894, filed on May 26, 2006.

(51) Int. Cl.
*C08G 64/00* (2006.01)
*C08G 63/02* (2006.01)

(52) U.S. Cl.
USPC ............................................................ 528/480

(58) Field of Classification Search
USPC ............................................................ 528/480
See application file for complete search history.

(56) References Cited

U.S. PATENT DOCUMENTS

| | | | |
|---|---|---|---|
| 4,241,107 A | 12/1980 | Mandish et al. |
| 4,874,432 A | 10/1989 | Kriech et al. |
| 4,980,030 A | 12/1990 | Johnson et al. |
| 5,254,256 A | 10/1993 | Zuerner et al. |
| 5,376,238 A | 12/1994 | Zambory |
| 5,643,399 A | 7/1997 | Venable |
| 5,880,218 A | 3/1999 | Gerace et al. |
| 5,916,392 A | 6/1999 | Ghanbari |
| 5,922,834 A | 7/1999 | Gerace et al. |
| 6,218,012 B1 | 4/2001 | Rota et al. |
| 6,455,598 B1 | 9/2002 | Gerace et al. |
| 7,128,780 B2 | 10/2006 | Matheson et al. |
| 2003/0236173 A1 | 12/2003 | Dobson, Jr. et al. |
| 2004/0101690 A1 | 5/2004 | Saitoh |
| 2005/0084334 A1 | 4/2005 | Shi et al. |
| 2005/0252419 A1 | 11/2005 | Mabey |
| 2010/0003505 A1 | 1/2010 | Yoon et al. |

FOREIGN PATENT DOCUMENTS

WO    99/03920 A1    1/1999

OTHER PUBLICATIONS

Stanley Roofing Co., Eterna-Seal System. (2009) Available Online at: http://www.stanleyroofing.com/html/eterna-seal_system.htm.
Truco, Inc. Eterna-Seal SEBS Rubber Coating 7145. (2009) Available Online at: http://www.truco-inc.com/data/7145.pdf.
Dow Surfactants- Nonylphenol ethoxylates. (1995) Available Online at: http://www.dow.com/surfactants/products/nonylph.htm.
Chemindustry.com, Santicizer160 Chemical Info. (1999) Available Online at: http://www.chemindustry.com/chemicals/524008.html.
Advisory Action pertaining to U.S. Appl. No. 12/207,610 dated Mar. 10, 2010.
Office Action pertaining to U.S. Appl. No. 12/207,610 dated Jun. 12, 2009.
Final Rejection pertaining to U.S. Appl. No. 12/207,610 dated Dec. 29, 2009.
Restriction Requirement pertaining to U.S. Appl. No. 11/753,605 dated Sep. 28, 2010.
Office Action pertaining to U.S. Appl. No. 11/753,605 dated Dec. 29, 2010.
Notice of Allowance pertaining to U.S. Appl. No. 11/753,605 dated Jun. 2, 2011.
Non-final Office Action relating to U.S. Appl. No. 13/221,988, dated May 1, 2012.
Notice of Allowance pertaining to U.S. Appl. No. 13/221,988 dated Aug. 16, 2012.
Office Action pertaining to U.S. Appl. No. 13/370,371 dated Jun. 5, 2013.

*Primary Examiner* — Terressa Boykin
(74) *Attorney, Agent, or Firm* — Dinsmore & Shohl LLP

(57) ABSTRACT

A composite roofing overlay containing paint waste is provided for use on a roof surface. The composite roofing overlay includes a bedding cement containing water-based paint waste and crushed recycled glass, a porous fabric embedded in the bedding cement, and at least one primer coat over the porous fabric and bedding cement. The composite roofing overlay may be used in combination with an overlying waterproof roofing membrane to provide an effective waterproof seal to new or existing roof structures.

15 Claims, 2 Drawing Sheets

COMPOSITE ROOFING OVERLAY CONTAINING RECYCLED PAINT WASTE AND RECYCLED CRUSHED GLASS

CROSS-REFERENCE TO RELATED APPLICATIONS

This application claims the benefit of U.S. application Ser. No. 13/221,988 filed Aug. 31, 2011, now U.S. Pat. No. 8,334,361, which is a division of U.S. Pat. application Ser. No. 11/753,605, filed May 25, 2007, now U.S. Pat. No. 8,029,868, which claims the benefit of U.S. Provisional Application No. 60/808,894, filed May 26, 2006. This application also claims the benefit of U.S. application Ser. No. 13/370,371 filed Feb. 10, 2012, which is a continuation-in-part of application Ser. No. 13/221,988 (U.S. Pat. No. 8,334,361). The entire contents of said applications are hereby incorporated by reference.

BACKGROUND OF THE INVENTION

The present invention relates to a composite roofing overlay containing recycled paint waste and recycled crushed glass, and more particularly, to a composite roofing overlay for use on new or existing roof surfaces.

Low-sloped roof construction is used for a wide variety of commercial and industrial buildings. Typically, low-sloped roofs include a waterproof layer or membrane which prevents the penetration of water resulting from precipitation or condensation on the roof surface. Where the waterproof layer comprises a membrane, the membrane may be comprised of materials such as EPDM rubber, thermoplastic polyolefins (TPO), polyvinyl chloride (PVC), chlorosulfonated polyethylene, and modified bitumen. The waterproof layer may also comprise a composite including layers of hot applied asphalt, reinforcing fiberglass, cloth, or paper. Elastomeric sealers may also be used in combination with cloth to form a water-resistant membrane. A number of additional layers may be included below the membrane such as insulation, supporting cover boards, and various vapor or thermal barrier layers.

Re-roofing an existing low-sloped roof is an expensive process as it typically requires tearing off the existing roof. In addition, there is a period of time during the re-roofing process in which the inside structure is exposed to outside weather elements, rendering the inside structure vulnerable to water damage. Further, tearing off an existing roof structure is environmentally undesirable as most of the components are discarded in a landfill, and the underlying components, such as insulation, also have to be replaced. Accordingly, it would be desirable to restore the existing roof.

In order to avoid the expense of removing and replacing an entire roof, an increasing emphasis has been placed on applying a secondary roofing system over an aged roof which allows all of the sub-roof layers to be utilized. Currently, the application of an EPDM or TPO membrane is widely used in re-roofing processes. In conjunction with the application of such a membrane, the underlying substrate which supports the membrane is important. Typical support substrates which have been used below roofing membranes include cover boards such as iso-board, asphaltic board, mineral fiberboard, fiberglass board, plywood or oriented strand board (OSB), wood fiberboard, or mineral aggregate board. While these materials generally lie flat in new construction, when used in reroofing applications, they may cause improper sloping, blisters, bubbling, raising, or seam separation due to the multiple underlying layers. In addition, support substrates comprised of these materials are not generally waterproof, and therefore not capable of preventing water infiltration into the roofing system in the event that the roof cover becomes compromised.

It would be desirable to provide an improved support for a roofing membrane which does not suffer from the drawbacks of roofing substrates such as cover boards.

Accordingly, there is a need in the art for a substrate which may be used in conjunction with a roofing membrane for use in new roofing construction or on an existing roof which is cost-effective, environmentally friendly, and which provides effective sealing and adhesion characteristics.

SUMMARY OF THE INVENTION

Embodiments of the invention meet that need by providing a composite roofing overlay produced using recycled paint waste and recycled crushed glass which provides a waterproof barrier on a roof surface. The composite roofing overlay can be used in combination with an overlying roofing membrane such as an ethylene propylene diene monomer (EPDM) or a thermoplastic polyolefin (TPO). Alternatively, an elastomeric sealant may be applied over the composite roofing overlay to form a combination roofing overlay/membrane.

While the composite roofing overlay described herein is primarily for use with existing roofs, it may also be used in new roof construction. The composite roofing overlay is also relatively inexpensive and environmentally friendly as it contains recycled paint waste and recycled crushed glass, and eliminates the need to dispose of old roofing materials in a landfill. In addition, the roofing overlay is monolithic and waterproof, which offers construction flexibility before the final roof cover is installed.

According to one aspect of the invention, a composite roofing overlay is provided which comprises bedding cement comprising water-based paint waste and recycled crushed glass; a porous fabric embedded in the bedding cement; and at least one primer coat over the porous fabric and bedding cement. By "water-based paint waste", it is meant water-based paint such as latex paint which has been collected after various paint jobs, paint which is past its shelf life, paint from municipal collection facilities, or any other unused latex paint used alone or in combination with paint waste. By "porous fabric," it is meant a fabric having a sufficient porosity to allow the bedding cement and/or primer to wick the fabric.

The bedding cement preferably comprises from about 10 to about 50% by weight water-based paint waste and from about 40 to 80% by weight crushed recycled glass. The recycled crushed glass preferably has a particle size of from about 0.001 mm to about 1.0 mm. The porous fabric preferably comprises a polyester cloth.

In one embodiment, the composite roofing overlay further includes an elastomeric sealer over the primer coat. The elastomeric sealer may comprise a paint waste residue comprising treated oil-based paint waste, water-based paint waste, at least one emulsifier, a virgin latex polymer, and a plasticizer. By "oil-based paint waste," it is meant oil-based paint collected as described above which includes solvents. By "virgin latex polymer," it is meant a polymer which is used in the form in which it was manufactured in an uncompounded state, i.e., it has not been formed into a product or mixed with any recycled polymer.

In one embodiment, the composite roofing overlay exhibits a compressive strength of about 1000 psi and a tensile strength of about 100 psi.

In another embodiment of the invention, a combination waterproof roofing membrane overlying a composite roofing overlay is provided, where the composite roofing overlay comprises bedding cement comprising water-based paint waste and recycled crushed glass, a porous fabric embedded in the bedding cement, and at least one primer coat over the porous fabric and bedding cement.

In one embodiment, the waterproof roofing membrane is selected from EPDM, thermoplastic polyolefin (TPO), polyvinyl chloride, modified bitumen, and chlorosulfonated polyethylene membranes. In this embodiment, the waterproof roofing membrane is preferably adhered to the composite roofing overlay with an adhesive which has been applied in a predetermined pattern.

In another embodiment, the waterproof membrane comprises an elastomeric sealer applied to the surface of the composite roofing overlay, which forms a waterproof membrane. The elastomeric sealer may comprise a paint waste residue comprising treated oil-based paint waste, water-based paint waste, at least one emulsifier, a virgin latex polymer, and a plasticizer.

Accordingly, it is a feature of embodiments of the invention to provide a composite roofing overlay or a combination waterproof roofing membrane/composite roofing overlay which provides an effective waterproof seal to a roof. These, and other features and advantages will become apparent from the following detailed description, the accompanying drawings, and the appended claims.

DETAILED DESCRIPTION OF THE PREFERRED EMBODIMENTS

Figure 1:
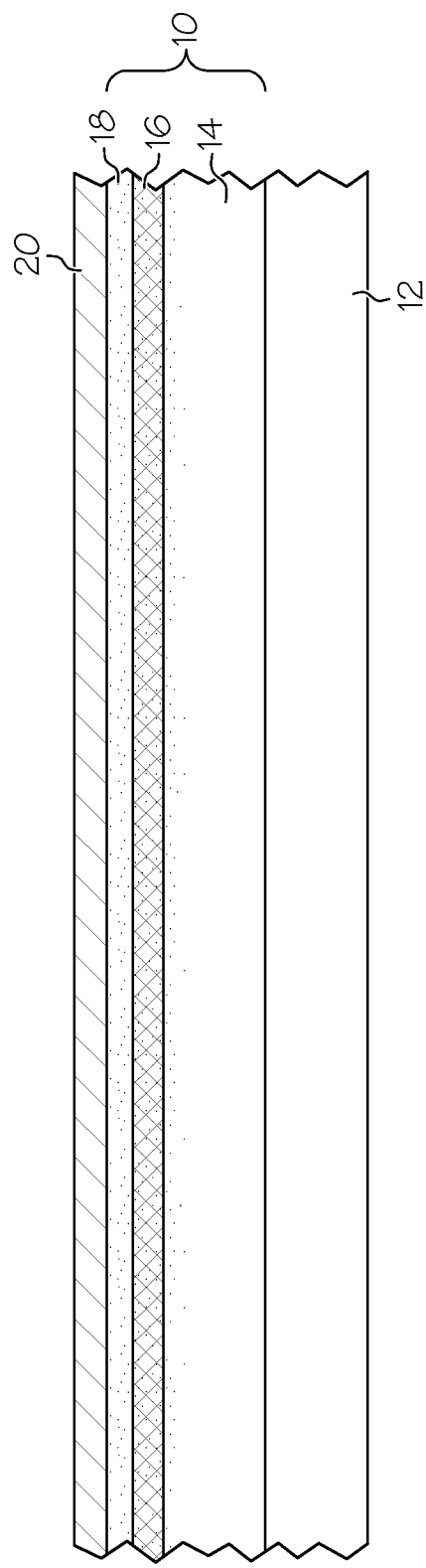
FIG. 1 is a cross-sectional view of a composite roofing overlay and waterproof roofing membrane in accordance with an embodiment of the invention.

Embodiments of the invention provide a high-performance composite roofing overlay which bonds to an existing roof cover and effectively seals isolated areas or an entire roof surface, forming a waterproof, seamless monolithic support and leveling layer. Such composite roofing overlays can be used on an existing roof to extend the life of the roof. Alternatively, the composite roofing overlay may be used to fabricate a new roof. The composite roof overlay is waterproof and may be used in combination with a waterproof roofing membrane to provide a durable, double-layered waterproof barrier.

While the composite roof overlay is primarily designed to be used on flat or low-sloped roofs, it may be used in any type of roofing application as a support for an outer roofing membrane. The overlay may be used on all types of flat or low-sloped roofs including metal, gravel, smooth buildup, membrane, and metal roofs. The overlay may also be applied to aged sprayed polyurethane foam covered roofs. It may also be used in vegetative green roofs and other kinds of applications in which it is desired to provide waterproof properties, such as ponds.

The use of the composite roofing overlay is environmentally desirable as it comprises recycled paint and crushed recycled glass as major components, i.e., the overlay is formed from bedding cement which comprises at least 25% by weight recycled water-based paint waste, and preferably at least 50% by weight (after drying), and preferably at least 50% by weight recycled crushed glass. Thus, the recycled content of the composite roofing overlay is essentially 100%, making the overlay relatively inexpensive to manufacture.

The water-based paint materials used to produce the bedding cement may be obtained from several sources including, but not limited to, automotive companies, industrial OEM equipment manufacturers, architectural painting contractors, household paint waste, paint manufacturers (who dispose of off-spec materials and waste products), paint distributors which have accumulated paint which is past its shelf life, paint contractors who accumulate paint residues left over from various paint jobs, and local land fills that accept paint waste from consumers.

The water-based paint waste (latex paint waste) may be used in the form in which it is collected. However, the paint waste is preferably screened prior to use to ensure that it is free of large particles or other foreign matter, followed by blending and/or conditioning. For example, a macerator pump may be used to homogenize the pre-screened latex by grinding down larger waste agglomerates into smaller particle sizes. After screening, blending and/or conditioning, the water-based paint preferably has a viscosity of between about 1,000 to 3,000 cps and a solids content of about 40% to 60%.

The bedding cement preferably comprises about 25% by weight water-based paint waste and about 75% by weight crushed recycled glass. A preferred source for the recycled glass is Horry County Solid Waste Authority, Conway, S.C. The crushed glass preferably has a particle size of from about 0.001 mm to 1.0 mm. It has been found that the use of crushed glass in the bedding cement provides a less expensive alternative to the use of other materials such as sand and provides the desired properties when combined with paint waste in the bedding cement.

The bedding cement is non-elastic, crack-resistant, and forms a strong bond with underlying roof substrates such as single-ply roofing membranes, modified bitumen, metal roofs, and sprayed polyurethane foam. Unlike traditional lime-based cements, the bedding cement is in the form of a flowable, heavy liquid which does not require preparation or mixing prior to use. The bedding cement also exhibits a long working time prior to curing, i.e., the curing time is controlled by water evaporation rather than chemical reaction, and is much slower, requiring days to cure vs. hours for a chemical system. This provides an advantage over quickly curing chemical systems, which require final completion of the roof surface before curing occurs, and which could result in an incomplete or imperfect surface in situations where production or weather delays occur.

The bedding cement may optionally include from about 1 to about 10% by weight of a plasticizer such as butyl benzyl phthalate. The plasticizer functions as a thixotrope, and may be included in applications where the bedding cement is used as a non-slump bedding cement, i.e., where the cement does not level upon application. This bedding cement composition may be used in situations where a desired slope needs to be maintained, e.g., to maintain proper drainage.

In one method of forming the composite roofing overlay, the bedding cement is applied to a roofing surface in liquid form containing about 80% by weight solids and water. The bedding cement may be pumped or trawled onto the roofing surface. After application of the bedding cement, a porous fabric is embedded in the bedding cement. One suitable porous fabric is a spun polyester cloth available from International Coatings under the designation Polylace. Another suitable fabric is Spunflex®, commercially available from Conklin. The roofing fabric may be applied in the form of a roll which is cut to proper length.

When the bedding cement/porous fabric combination has dried (within about one week under dry weather conditions), at least one coating of surface primer (about 1 gallon per 100 square feet) is applied to the entire surface. It should be appreciated that because of the porous nature of the fabric, the primer applied over the fabric not only saturates the fabric and forms a film over the fabric, but also penetrates and adheres to the bedding cement. The primer may optionally also be applied to the surface of the bedding cement prior to application of the polyester cloth, followed by another application of primer after the fabric is applied.

The primer may comprise any commercially available primers such as those available from Sealoflex Waterproofing Systems and Hydro-Stop Roofing and Waterproofing Systems. Alternatively, the primer may comprise oil-based paint waste and water-based paint waste as described in U.S. Pat. No. 8,029,868, which is incorporated herein by reference. Such a primer comprises about 24% by weight of paint waste residue formed from oil-based paint waste, about 57% by weight water-based paint waste, about 4% of an emulsifier; and about 2% by weight of a plasticizer. The oil-based paint waste may be obtained from the same sources described above, and is preferably treated by removal of a portion of the solvents in the paint waste under vacuum at a temperature of about 225° F. such that a paint waste residue is formed. The paint waste residue is then emulsified by the addition of one or more surfactants as described in U.S. Pat. No. 8,029,868.

If desired, an additional coating such as an elastomeric caulk may also optionally be included on the primer layer of the bedding cement as described in U.S. Pat. No. 8,029,868. The elastomeric caulk can be used to correct imperfections on the dried composite overlay surface.

The resulting composite roofing overlay provides a monolithic water barrier that bonds continuously to an existing roof with no seams. Because the composite roofing overlay provides a waterproof barrier, there is no need for additional waterproofing or adhesion promoting layers which are normally required with the use of roof cover board. Installation of the composite roofing overlay is simple as it requires no cutting and fitting, no handling of cover boards, no fasteners, and shorter labor time. The bedding cement has good leveling upon application, even with sunken and uneven roof areas. It should be appreciated that larger depressions can be pre-filled with the bedding cement before the final application of the overlay.

The composite roofing overlay forms a waterproof surface soon after application, and after a preferred drying time of about one week at ambient temperatures, exhibits a compressive strength (50×50×50 mm) of about 900 psi (ASTM D 1621), a flexural strength (40×40×160 mm) of about 200 psi (ASTM C 348), and a tensile strength (t/D=0.25) of about 100 psi (ASTM D 3967).

When used on an existing built-up roof, the composite overlay thickness is preferably about ¼ inch to ½ inch (0.64 to 1.28 cm).

In one preferred embodiment, a waterproof roofing membrane is applied over the composite roofing overlay. Preferred waterproof membranes are single-ply elastomeric membranes which include EPDM, TPO, polyvinyl chloride, modified bitumen, and chlorosulfonated polyethylene membranes. Suitable membranes are commercially available from Firestone, Carlisle, and GAF. However, it should be appreciated that any pre-cured roofing membrane may be used in conjunction with the composite roofing overlay. It should also be appreciated that the composite roofing overlay may be used as a seamless waterproof underlayment for use in flat roof applications or in any applications where cover board is typically used.

As an alternative to the use of a separate waterproof membrane, an elastomeric sealer may be applied directly over the composite roofing overlay. Upon drying, the elastomeric sealer forms a waterproof membrane, which eliminates the need for a separate roofing membrane as described above. One example of an elastomeric sealer composition comprises paint waste residue formed from treated oil-based paint waste, water-based paint waste, at least one emulsifier, a virgin latex polymer, and a plasticizer. The elastomeric sealer preferably comprises about 24% by weight of the paint waste residue formed from treated oil-based paint waste, about 20% water-based paint, about 4% of an emulsifier, about 37% of a virgin latex polymer, and about 2% by weight plasticizer as described in U.S. Pat. No. 8,029,868, incorporated herein by reference. Other commercially available elastomeric sealers which are suitable for use include Sealoflex® CT Top and Hydro-Stop FM4470.

The elastomeric sealer may be formed by providing the formed paint waste residue and then phase-inverting the paint waste residue to an oil-in-water emulsion by slowly adding surfactants and warm water prior to the addition of the water-based paint waste and other components.

Referring now to FIG. 1, a composite roofing overlay structure 10 formed on a roofing surface 12 is shown. Bedding cement 14 is applied to the roof surface 12 which is preferably cleared of gravel and/or soil. The bedding cement may be applied in an amount of about 30 gallons per 100 square feet for a gravel-cleared, gravel covered built-up roof, and about 20 gallons per square feet for either a smooth, built-up roof, a single-ply membrane, a shingle surface, or new roof substrate.

A layer of porous fabric 16 is embedded in the wet bedding cement. In instances where the roof contains depressed areas, the bedding cement/porous fabric combination can be applied in successive layers to those areas after each of the previously layers is sufficiently dry. In such instances, the bedding cement may be applied without fabric. It should be appreciated that the drying time will vary depending on the thickness of the applied layer(s) and the weather conditions. The layers are considered to be dry when they do not deform upon applied pressure and/or can be walked on without deformation.

When the bedding cement/porous fabric combination is dry (can be walked on without deformation), at least one coating of surface primer 18 is applied at about 1 gallon per 100 square feet to the entire surface to form the composite roofing overlay 10. A separate waterproof roofing membrane 20 may then optionally be applied over the composite roofing overlay as shown. The waterproof membrane is preferably adhered to the composite roofing overlay using an adhesive. In one embodiment, the membrane may be fully adhered to the roof substrate. The adhesive is preferably a polyurethane-based adhesive and may include commercially available water or solvent based adhesives and contact cements.

Alternatively, the membrane may be fastened with the use of a commercially available single-part moisture-cured urethane sealant. Examples of such sealants are Titebond® from Franklin International or NP1™ from Sonneborn. In this embodiment, the urethane sealant is preferably applied in a criss-cross pattern of linear beads with seam spacing of about four feet, where the membrane overlap seam is coated with bonding adhesive. Where excessive wind lift is a concern, the seam spacing may be reduced to two feet. In addition, the membrane overlap seams may be covered with a six-inch wide strip of a three-ply membrane consisting of elastomeric sealer/cloth/elastomeric sealer.

Figure 2:
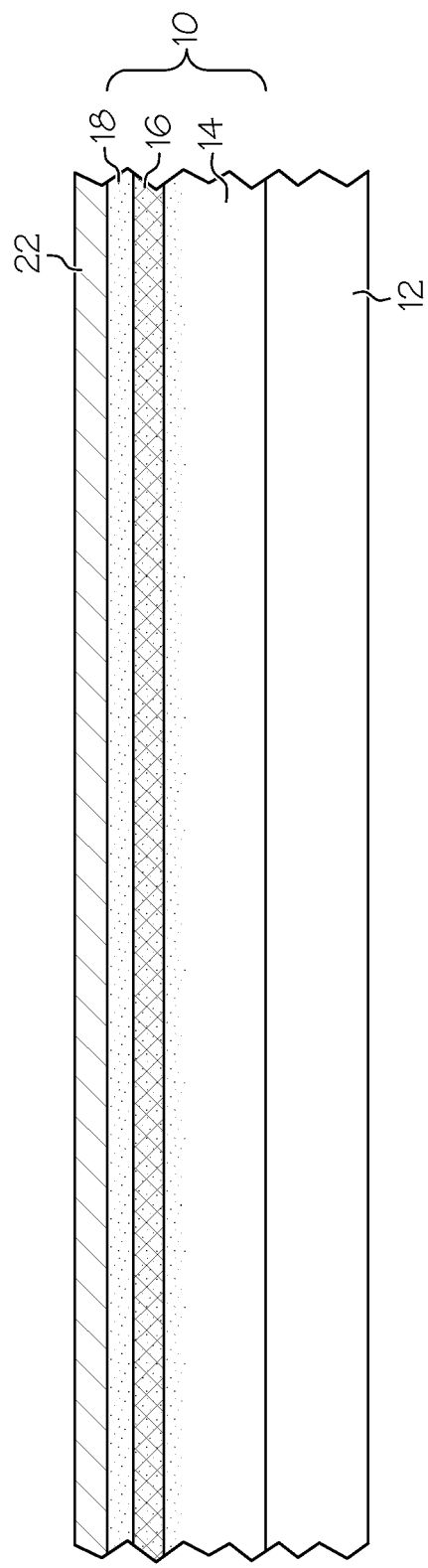
FIG. 2 is a cross-sectional view of a composite roofing overlay including an elastomeric sealer/membrane in accordance with another embodiment of the invention.

Referring now to FIG. 2, an alternative embodiment is shown in which an elastomeric sealer 22 is applied to the composite roofing overlay. Upon application to the composite roofing overlay, a film is formed which forms a membrane which is bonded directly to the bedding cement. The combination of the composite roofing overlay and elastomeric sealer/film forms the waterproof roof cover.

Having described the invention in detail and by reference to preferred embodiments thereof, it will be apparent that modifications and variations are possible without departing from the scope of the invention.

What is claimed is:

1. A composite roofing overlay comprising:
   bedding cement comprising water-based paint waste and crushed recycled glass;
   a porous fabric embedded in said bedding cement; and
   at least one primer coat over said porous fabric and bedding cement.

2. The composite roofing overlay of claim 1 further including an elastomeric sealer over said at least one primer coat.

3. The composite roofing overlay of claim 2 wherein said elastomeric sealer comprises a paint waste residue comprising treated oil-based paint waste, water-based paint waste, at least one emulsifier, a virgin latex polymer, and a plasticizer.

4. The composite roofing overlay of claim 1 wherein said porous fabric comprises a polyester cloth.

5. The composite roofing overlay of claim 1 wherein said bedding cement comprises from about 10 to about 50% by weight water-based paint waste and from about 40 to 80% by weight crushed recycled glass.

6. The composite roofing overlay of claim 1 wherein said crushed recycled glass has a particle size of from about 0.001 mm to 1.0 mm.

7. The composite roofing overlay of claim 1 having a compressive strength of about 1000 psi.

8. The composite roofing overlay of claim 1 having a tensile strength of about 100 psi.

9. In combination, a waterproof roofing membrane overlying a composite roofing overlay, said composite roofing overlay comprising bedding cement comprising water-based paint waste and recycled crushed glass; a porous fabric embedded in said bedding cement; and at least one primer coat over said porous fabric and bedding cement.

10. The combination of claim 9 wherein said waterproof membrane is selected from EPDM, thermoplastic polyolefin (TPO), polyvinyl chloride, modified bitumen, and chlorosulfonated polyethylene membranes.

11. The combination of claim 9 further comprising an elastomeric sealer applied to the surface of said composite roofing overlay.

12. The composite roofing overlay of claim 11 wherein said elastomeric sealer comprises a paint waste residue comprising treated oil-based paint waste, water based paint waste, at least one emulsifier, a virgin latex polymer, and a plasticizer.

13. The combination of claim 9 wherein said bedding cement comprises from about 10 to about 50% by weight water-based paint waste and from about 40 to 80% by weight recycled crushed glass.

14. The combination of claim 9 wherein said waterproof roofing membrane is adhered to said composite roofing overlay with a polyurethane sealant.

15. The combination of claim 14 wherein said polyurethane sealant has been applied in a criss-cross pattern.

* * * * *